(12) United States Patent
Muller et al.

(10) Patent No.: US 7,159,245 B1
(45) Date of Patent: Jan. 2, 2007

(54) METHOD FOR PROTECTING A PORTABLE CARD

(75) Inventors: Frank Muller, Delft (NL); Gerrit Roelofsen, Leiden (NL)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/019,344

(22) PCT Filed: May 19, 2000

(86) PCT No.: PCT/EP00/04627

§ 371 (c)(1),
(2), (4) Date: Dec. 21, 2001

(87) PCT Pub. No.: WO01/05090

PCT Pub. Date: Jan. 18, 2001

(30) Foreign Application Priority Data

Jul. 13, 1999 (NL) .................................... 1012581

(51) Int. Cl.
*G06F 1/26* (2006.01)
*H04K 1/00* (2006.01)
*H04L 9/00* (2006.01)

(52) U.S. Cl. ........................... 726/34; 380/265; 380/46
(58) Field of Classification Search ................... 380/46
See application file for complete search history.

(56) References Cited

U.S. PATENT DOCUMENTS

| | | | | |
|---|---|---|---|---|
| 5,054,067 A | * | 10/1991 | Moroney et al. | 380/37 |
| 5,365,585 A | | 11/1994 | Puhl et al. | 380/9 |
| 6,278,780 B1 | * | 8/2001 | Shimada | 380/47 |
| 6,327,661 B1 | * | 12/2001 | Kocher et al. | 713/193 |
| 6,510,228 B1 | * | 1/2003 | Rose | 380/46 |

FOREIGN PATENT DOCUMENTS

| | | |
|---|---|---|
| DE | 196 22 533 | 12/1997 |
| WO | WO 98/52319 | 11/1998 |

OTHER PUBLICATIONS (International Search Report supplied).
Paul C. Kocher, "Timing Attacks on Implementations of Diffie-Hellman, RSA, DSS, and Other Systems", Proceedings of the Annual International Cryptology Conference (Crypto), vol. CONF. 16, 1996, pp. 104-113.

* cited by examiner

*Primary Examiner*—Gilberto Barrón, Jr.
*Assistant Examiner*—Kristin D. Sandoval
(74) *Attorney, Agent, or Firm*—Michaelson & Associates; Peter L. Michaelson

(57) ABSTRACT

A method for protecting a portable card, provided with at least a crypto algorithm for enciphering data and/or authenticating the card, against deriving the secret key through statistical analysis of its information leaking away to the outside world in the event of cryptographic operations, such as power-consumption data, electromagnetic radiation and the like. The card is provided with at least a shift register having a linear and a non-linear feedback function for creating cryptographic algorithms. An algorithm is applied to the card, which is constructed in such a manner that the collection of values of recorded leak-information signals is resistant to deriving the secret key from statistical analysis of those values. Advantageously, after the key has been loaded into the shift register, the shift register clocks on, using at least the linear-feedback function. A suitable alternative is loading only the key into the shift register in the event of a fixed content of the shift register.

10 Claims, 1 Drawing Sheet

METHOD FOR PROTECTING A PORTABLE CARD

BACKGROUND OF THE INVENTION

1. Field of the Invention

The invention relates to a method for protecting a portable card, provided with at least a crypto algorithm for enciphering data and/or authenticating the card, against deriving the secret key through statistical analysis of its information leaking away to the outside world in the event of cryptographic operations, such as power consumption data, electromagnetic radiation and the like. The card is provided with at least a shift register having a linear and a non-linear feedback function for creating cryptographic algorithms. The method comprises loading data to be processed and a secret key in the shift register of the card.

2. Description of the Prior Art

Using a secret key to process input information and/or to produce output information is generally known in the event of cryptographic devices. Using feedback shift registers is also generally known for creating cryptographic algorithms.

In this connection, data to be consecutively processed and a secret key are loaded into one or more shift registers. Here, the sequence of loading data and the key is random.

Subsequently, the output of the shift register and possibly the shift-register contents are applied, using linear and/or non-linear-feedback, to determine the output of the entire algorithm. The input of the shift register then, apart from the data and the key, also consists of a linear and a non-linear combination of the shift-register contents.

Such shift registers are generally applied in the event of portable cards, such as chip cards, calling cards, smart-card products and the like.

Since the secret key is not known to unauthorized third parties, it is basically impossible to derive either the input or the key from the output of the algorithm.

Now it has become apparent, however, that for chip cards and the like it is possible, in the event of computations, to derive the secret key used from a statistical analysis of the power consumption of the card. Such methods are known as "Differential Power Analysis" (=DPA) and are described in the Internet publication DPA Technical Information: "Introduction to Differential Power Analysis and Related Attacks" by P. Kocher et al., Cryptography Research, San Francisco, 1998.

Such methods are based on the fact that, in practice, with cryptographic operations, information is leaking away to the outside world in the form of power-consumption data, electromagnetic radiation and the like.

Thus, logical microprocessor units show regular transistor-switching patterns which externally (i.e., outside the microprocessor) noticeably produce electrical behaviour.

In this manner, it is possible to identify macro characteristics, such as microprocessor activity, by recording the power consumption and deriving information on the secret key used by way of statistical analysis of the data thus obtained.

SUMMARY OF THE INVENTION

The invention now overcomes this drawback in the art and provides a portable card which is resistant to such analyses and therefore provides a card which is safe to use.

The method according to the invention is characterized in that an algorithm is applied to the card which is constructed in such a manner that the collection of values of recorded leak-information signals is resistant to deriving the secret key by way of statistical analysis of those values. Advantageously, after loading the key into the shift register, the shift register is subsequently clocked on, during a specific period of time, several times, at least making use of the linear feedback function.

A suitable alternative according to the invention is loading only the key into the shift register in the event of a fixed content of the shift register.

In a first advantageous embodiment of the invention, there is first loaded the key, subsequently clocking on is performed, after which the data is loaded.

In another advantageous embodiment of the invention, the key is first loaded, subsequently the data is loaded into the shift register, making exclusive use of the linear feedback function and subsequently the clocking on is performed.

In yet another advantageous embodiment of the invention, the data is first loaded, subsequently the key is loaded, making exclusive use of the linear feedback function, whereafter clocking on is performed.

BRIEF DESCRIPTION OF THE DRAWINGS

The invention will now be further explained with reference to the drawing and the description by way of non-limiting examples.

FIG. 1 schematically shows a typical shift register as applied with a portable card, such as a chip card and the like.

DETAILED DESCRIPTION

Figure 1:
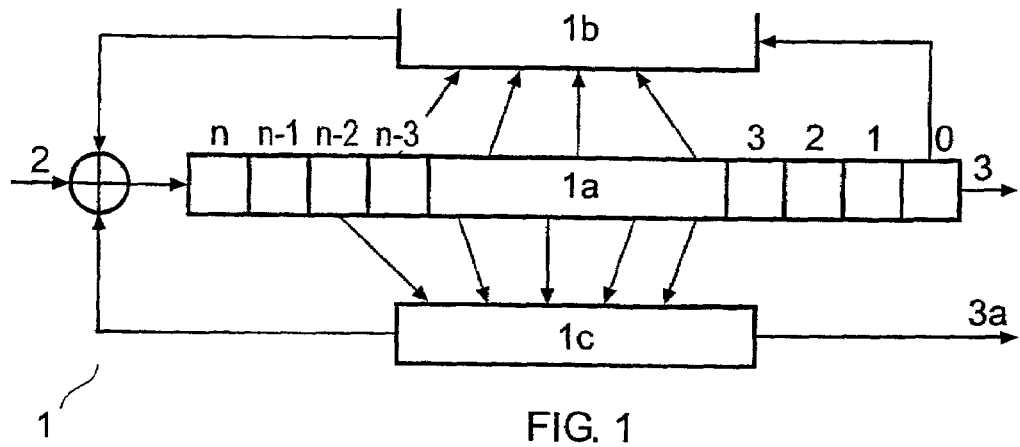

Referring now to FIG. 1, there is shown a feedback shift register 1, which is applied in any way suitable for that purpose to a portable card, not shown for simplicity's sake, such as a chip card, calling card and the like, having an input 2 and an output 3.

The feedback shift register 1 comprises a shift register 1a, as well as a feedback function, which in this case consists of a linear function 1b and a non-linear function 1c with the latter having an output 3a. Such a feedback shift register, due to its relatively low costs, is eligible for being applied to, e.g., calling cards and the like. Through the non-linear function, each bit depends on each number of key bits.

Shift registers are generally known and their operation will therefore not be described in detail. The shift register 1a consists of a series of bits. The length of a shift register is expressed in bits; in the event of a length of n bits, it is called an n-bit shift register.

Each time a bit is required, all bits in the shift register are shifted 1 bit to the right. The new left bit is calculated as a function of the bits remaining in the register and the input.

The output of the shift register is 1 bit, often the least significant bit. The period of a shift register is the length of the output series before repetition starts.

Data is loaded by way of the input 2; the key is loaded, and results are produced by way of the output 3 or, if so desired, 3a. In a similar situation, however, there may be carried out an attack on the secret key used by way of DPA, based on power variations of the system in the event of computations via statistical analysis of "leak data" and error-correcting techniques.

In this connection, it should be noted that, from a security viewpoint, it is desirable to load the key and the data non-linearly into the shift register. It has become apparent, however, that in the event of calculations, non-linearly loading the key and the data into the shift register increases the chance of deriving the secret key used through statistical analysis of the power consumption.

Figure 2:
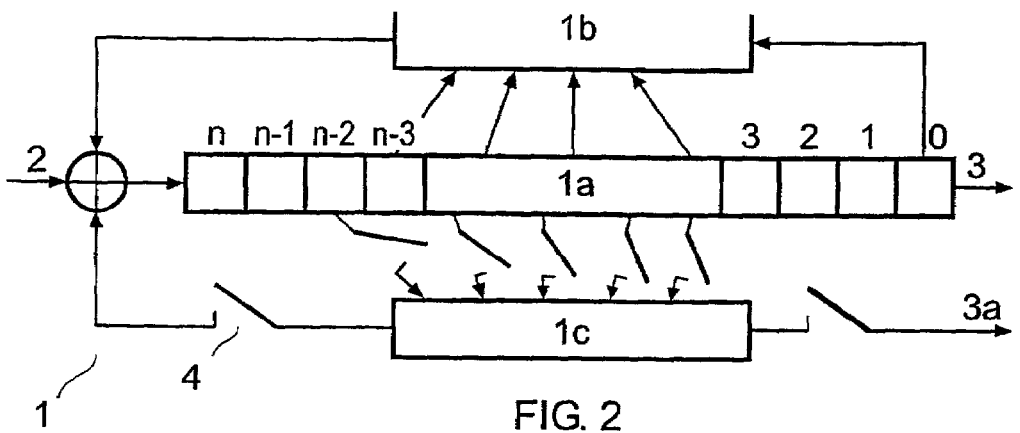
FIG. 2 schematically shows an advantageous solution according to the invention, and FIG. 3 schematically shows another advantageous solution according to the invention.
Figure 3:
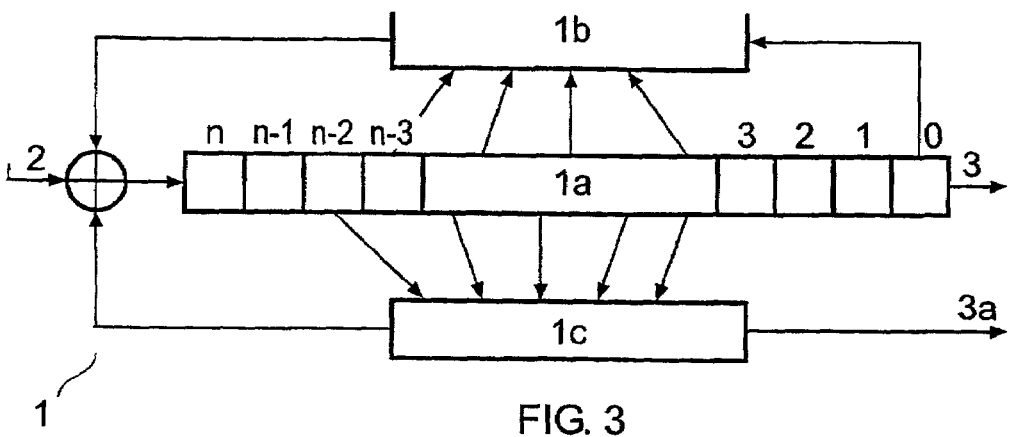

In FIG. 2 and FIG. 3, the same reference numerals as used in FIG. 1 refer to the same components.

FIG. 2 now shows an advantageous embodiment of the invention, the key first being loaded into the shift register, subsequently data being loaded, at least initially, exclusively using the linear-feedback function, and then clocking (e.g., 100 times or more) of the shift register taking place. During loading the data and, if so desired, the subsequent clocking on, the non-linear function of the shift register is deactivated until the shift register has been sufficiently clocked. Then, the non-linear function is switched once again.

In doing so, the linear-feedback function 1b continues to be active.

Deactivating and activating, as the case may be, the non-linear function 1c may take place in any way suitable for that purpose, e.g., using switches.

The shift register 1a is advantageously clocked so many times that the contents of all elements of the shift register depends on a large portion of the bits of the key.

In another advantageous embodiment, after loading the key, the shift register is first clocked until the contents of all elements of the shift register depend on a large portion of the bits of the key. Only after this clocking, the data in the shift register 1a is permitted to be loaded and non-linear operations on the contents of the shift register are also permitted to be effected.

Clocking takes place in any way known to those skilled in the art and will therefore not be explained in further detail.

For completeness' sake, it should be noted that DPA is only capable of being carried out if a non-linear operation of the data with the key takes place. Since, in addition, the effort required for DPA rises exponentially with the number of key bits on which the bits in the shift register depend, it is achieved in this manner that, in the event of sufficient interim clocking of the shift register 1a, applying DPA does not result in short-term success.

In FIG. 3, there is shown an advantageous variant of the invention, the key having been loaded with fixed contents of the shift register (which may also consist purely of zeros) and clocking the shift register taking place with an active linear and an active non-linear feedback function, but without data being loaded into the shift register during the clocking period. In doing so, the input of data into the shift register after loading the key is disconnected from the shift register and is reinstated again after a specific clocking period. Due to the fixed contents of the shift register, it is not permitted to apply any modifications and an unauthorized third party shall not be capable of determining a collection of different values of leak data, such as power consumption, and subject it to statistical analysis in order to retrieve the key.

In this solution according to the invention, the key may therefore be loaded non-linearly, and deactivating the non-linear feedback function will not be required.

In another advantageous embodiment of the invention, in the event that the key, after data has been loaded into the shift register, is not loaded with the fixed contents of the shift register, the key is loaded into the shift register using only the linear-feedback function, whereafter subsequent clocking is permitted to take place.

After the aforementioned description, various modifications of the method according to the invention will become apparent to those skilled in the art.

Such modifications shall be deemed to fall within the scope of the invention.

The invention claimed is:

1. A method for protecting a portable card, provided with a cryptographic algorithm for enciphering data and/or authenticating the card, against deriving a secret key used in the card from statistical analysis of information leaking away from the card to an outside world in the event of cryptographic operations performed by the card, the card being provided with at least a shift register having linear and non-linear feedback functions for implementing cryptographic algorithms, the method comprising the steps of:

loading data to be processed and a secret key into the shift register of the card; and controlling the linear and non-linear feedback functions separately from each other in such a manner that collection of values of recorded leak-information signals is resistant to deriving the secret key through said statistical analysis of the values.

2. The method recited in claim 1 wherein said manner comprises invoking the linear and non-linear feedback functions in a predefined sequence.

3. The method recited in claim 1 wherein the information leaking away to the outside world comprises either power-consumption data or electromagnetic radiation.

4. The method recited in claim 1 further comprising the steps of:

after the key has been loaded into the shift register, clocking the shift register several times, during a specific period, using at least the linear-feedback function;

then loading data into the shift register only using the linear-feedback function; and subsequently clocking the shift register.

5. The method recited in claim 4 further comprising the step of: during a first instance of clocking the shift register, clocking the shift register for a time such that the contents of all elements of the shift register largely depend on bits of the key.

6. The method recited in claim 4 further comprising the steps of:

after the key has been loaded into the shift register, disconnecting the data from an input to the shift register; and after the specific period has occurred, reconnecting the data to the input of the shift register so that the data can then be loaded into the shift register.

7. The method recited in claim 1 further comprising the step of:

after the key has been loaded into the shift register, clocking the shift register, during a specific period, several times, with the linear and non-linear feedback functions of the shift register being active but no data being loaded into the shift register during or prior to the clocking or prior to loading the key.

8. The method recited in claim 7 further comprising the steps of:

after the key has been loaded into the shift register, disconnecting the data from an input to the shift register; and after the specific period has occurred, reconnecting the data to the input to the shift register so that the data can then be loaded into the shift register.

9. The method recited in claim 1 further comprising the step of:

loading the key into the shift register with both the linear and non-linear functions being active and only when the contents of the shift register are fixed.

10. The method recited in claim 1 further comprising the steps of:

if the key is not been loaded into the shift register while the contents of the shift register are fixed, loading the key into the shift register using only the linear feedback function; and then clocking the shift register.

* * * * *